(12) United States Patent
Thiemann et al.

(10) Patent No.: US 7,032,534 B1
(45) Date of Patent: Apr. 25, 2006

(54) ARTICLE FOR USE AGAINST BACKGROUNDS OF VARIOUS COLORS AND METHOD OF MANUFACTURE

(75) Inventors: Ronald Thiemann, Cincinnati, OH (US); Hubert A. Thiemann, Cleves, OH (US)

(73) Assignee: Knittel Engraving Co., Inc., Miamitown, OH (US)

( * ) Notice: Subject to any disclaimer, the term of this patent is extended or adjusted under 35 U.S.C. 154(b) by 0 days.

(21) Appl. No.: 10/160,486

(22) Filed: May 31, 2002

(51) Int. Cl.
*B43L 7/00* (2006.01)

(52) U.S. Cl. ............... 116/1; 116/DIG. 41; 33/1 B; 33/494; 33/564; 33/562; 33/679.1

(58) Field of Classification Search .......... 118/201, 118/1, 288, DIG. 1, DIG. 41; 428/209; 33/1 B, 33/679.1, 494, 562, 563, 564, 565
See application file for complete search history.

(56) References Cited

U.S. PATENT DOCUMENTS

| 2,365,735 | A | * | 12/1944 | Ware ........................ 33/489 |
| 4,173,075 | A | * | 11/1979 | Stewart ..................... 33/23.11 |
| 4,490,921 | A | * | 1/1985 | Woods et al. .............. 33/476 |
| 4,718,553 | A | * | 1/1988 | Adamoli et al. .......... 116/201 |
| 4,779,346 | A | | 10/1988 | Schafer ...................... 33/1 B |
| 5,058,088 | A | * | 10/1991 | Haas et al. ................ 116/200 |
| 5,128,194 | A | * | 7/1992 | Sorko-Ram ................ 428/209 |
| 5,270,101 | A | * | 12/1993 | Helicher .................... 428/209 |
| 5,446,705 | A | * | 8/1995 | Haas et al. ................ 116/200 |
| 5,557,996 | A | | 9/1996 | Reber et al. ................. 85/56 |
| 5,643,667 | A | * | 7/1997 | Tsukioka .................... 428/209 |
| 5,715,215 | A | * | 2/1998 | Haas et al. ................ 116/200 |
| 5,743,038 | A | * | 4/1998 | Soto .......................... 40/743 |
| 5,791,062 | A | | 8/1998 | Walker ....................... 33/563 |
| 5,819,422 | A | | 10/1998 | Schafer ...................... 33/113 |
| 6,061,920 | A | | 5/2000 | McMorrow ................. 33/494 |
| 6,295,252 | B1 | * | 9/2001 | Holt et al. ................ 116/200 |
| 6,491,782 | B1 | * | 12/2002 | Jaynes ...................... 428/209 |
| 6,582,801 | B1 | * | 6/2003 | Schmitt .................... 428/209 |
| 2001/0051255 | A1 | * | 12/2001 | Fields et al. .............. 428/209 |
| 2004/0205975 | A1 | * | 10/2004 | Brady ........................ 33/562 |

FOREIGN PATENT DOCUMENTS

JP         04089501 A   *   3/1992

* cited by examiner

*Primary Examiner*—Richard Smith
*Assistant Examiner*—Travis Reis
(74) *Attorney, Agent, or Firm*—Mark F. Smith; Smith Brandenburg & Novak Ltd

(57) ABSTRACT

The present invention is directed to an article formed from a generally see-thru sheet of material and having a two-sided marking thereon and a method of applying the two-sided markings to the article. In a preferred embodiment of the invention, the article comprises a see-thru sheet of material having a top face and markings thereon and a bottom face such that when viewed from the top face the markings are of a first color and when viewed from the bottom face the markings are of a second color. In another preferred embodiment of the invention, the article formed by the process comprising the steps of selecting a sheet of material having a top face and a bottom face, positioning a two-color foil over the sheet of material, and applying heat and pressure to the two-color foil to bond the foil to selected areas of the sheet to form markings such that when viewed from the top face the markings are of one color and when viewed from the bottom face the markings are of another color.

11 Claims, 8 Drawing Sheets

ARTICLE FOR USE AGAINST BACKGROUNDS OF VARIOUS COLORS AND METHOD OF MANUFACTURE

BACKGROUND OF THE INVENTION

The subject invention is direct to an article for use against backgrounds of various colors and, more particularly, to an article comprising a first side having markings thereon and a second side whereby when viewed from the first side the markings are of a first color and when viewed from the second side the markings are of a second color.

Various tools and instruments, hereinafter collectively referred to as "instruments" are available to assist users to take measurements or to create drawings. For example, measurement devices are often used in measuring fabrics, wall coverings, map distances, and the like. Instruments, such as a T-square, protractor, scales, and triangles are often used to create drawings. Typically, such instruments include various types of visible markings. Such measurements, however, are often performed on articles having multicolored backgrounds and, depending on the color of the markings and the background, the markings may be difficult for the user to see.

Measuring devices have been developed to enhance the visibility of such markings against a multicolor background. One such device is shown in U.S. Pat. No. 4,779,346 whereby composition lines are formed of a first line of a first color and a second line of a second color different from the first color, such that the composition lines will be visible against backgrounds of various colors. The first line is preferably of a lesser breadth than the second line, and is superimposed on the second line so that the second line is visible on each side of the first line, and either line will be visible against a multicolored background. Unfortunately, the manufacturing process for this device involves several steps. Further, to insure uniformity in the appearance of the second line on both sides of the first line, the second line must be precisely centered over the first line. Imprecise centering of the second line can result in an irregular appearing composite line that can be confusing to the eye and may interfere with precise alignment and measurement.

Accordingly, a need exists for an article for use against backgrounds of various colors, that has markings that are easily visible against multicolored backgrounds, that can be easily and accurately manufactured, and which is relatively inexpensive to manufacture.

SUMMARY OF THE INVENTION

The present invention is directed to an article and method of manufacture whereby the article comprises a see-thru sheet of material having a top face and markings thereon and a bottom face such that when viewed from the top face the markings are of a first color and when viewed from the bottom face the markings are of a second color.

In a preferred embodiment of the present invention, the article comprises a generally transparent sheet of material having markings formed on one side of the sheet by use of a foil.

In another preferred embodiment of the invention the foil is a two-color foil.

In another preferred embodiment of the invention the foil is a two-color foil wherein the colors are contrasting colors.

In another preferred embodiment of the present invention, the article is a measuring device having markings such as measurement markings or scales effective for taking the dimensions of the object being read.

In another preferred embodiment of the present invention, the article is an engineering and drawing instrument having markings such as grids or angular indicia effective for drawing lines or taking measurements of an underlying object.

In another preferred embodiment of the present invention, the article is a template for the drafting and measurement of symbols.

In another preferred embodiment of the invention, the article is a sign having markings in the form of a message or a design.

In another preferred embodiment of the present invention, the article is a display device.

Another preferred embodiment of the invention is a method of manufacturing the article of the present invention.

In a preferred embodiment of the invention the method comprises the steps of selecting a see-through sheet of material having a desired geometry and applying a two-colored foil to the surface of the sheet.

In another preferred embodiment of the invention, the sheet has a geometric shape selected from the group consisting of rectangular, oval, circular, triangular, and a combination thereof.

In another preferred embodiment of the invention, the two-colored foil is applied to the surface of the sheet using a conventional punch or die.

Other aspects and advantages of the invention will be apparent from the following description, the accompanying drawings and the appended claims.

DETAILED DESCRIPTION OF THE INVENTION

The present invention is directed to an article formed from a generally see-thru sheet of material and having two-sided markings thereon and a method of applying the two-sided markings to the article. Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
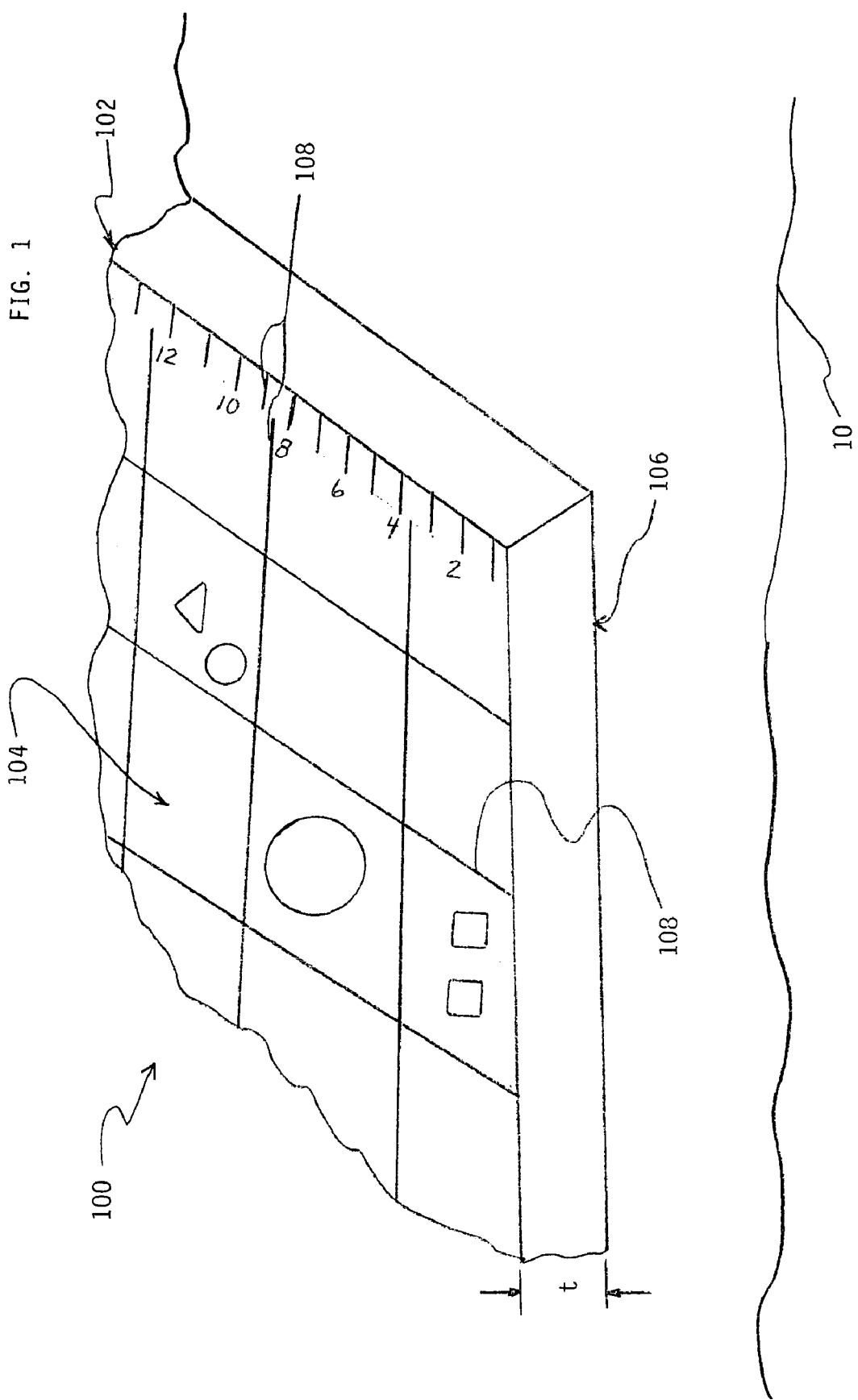
FIG. 1 is a partial perspective side view of a first representative embodiment of an article of the subject invention formed from a see-thru sheet of material having two-sided markings thereon.

Referring to FIG. 1, an article 100 is shown comprising a sheet 102 formed from a see-through material whereby when the article 100 is placed on a work piece 10 (e.g., a sheet of paper, a fabric, etc.), the underlying work piece is visible through the article 100. Preferably, the see-thru material is transparent, such as a transparent plastic or glass, however certain light translucent materials, materials having modest degrees of cloudiness or other visual impediment, are acceptable so long as the work piece 10, and any lines and indicia on the underlying work piece 10 formed by the two-sided markings 108 can be observed. Accordingly, any material that provides a suitable degree of light transmission that permits the observance of the underlying work piece 10, is acceptable.

In a preferred embodiment of the invention, the see-through sheet of material 102 is a relatively flat sheet having a top face 104 and a bottom face 106 and having a thickness t of approximately 3 mm to about 5 mm. It should be understood, however, that the particular thickness t of the sheet 102 to be used is not critical and will depend on the particular type of article and the particular use of the article.

The sheet 102 includes opaque markings 108 on the top face 104 thereof, which can be viewed from the top face 104 and from the bottom face 106 of the sheet 102. As used herein, the term "marking" includes the full complement of measurement and drafting capabilities which the article is equipped by virtue of the lines and line segments, scales that define discrete measurable distances, grids, reference lines, drawings, or combinations thereof. Thus, "marking" includes, without limitation, scales, the protractor, reference lines, drawings, lettering, and other such indicia. When viewed from the top face 104 the markings 108 will be of one color or can comprise more than one color. When viewed from the bottom face 106, the markings 108 will be of another different color or can comprise more than one different color. Preferably, the color or colors of the markings 108 observed from the top face 104 and the color or colors of the markings 108 observed from the bottom face 106 are of a contrasting nature. For example, when viewed from the top face 104 the markings 108 will be a color such as yellow and when viewed from the bottom face 106 the markings will be a color such as black. Other color combinations such as orange and dark blue and white and black may also be selected to permit easy visibility of the markings 108 against backgrounds of various colors. Preferably the markings are positioned on the top face 104 of the sheet 102, it should be understood, however, that the markings may be placed on the bottom face 106.

Figure 2:
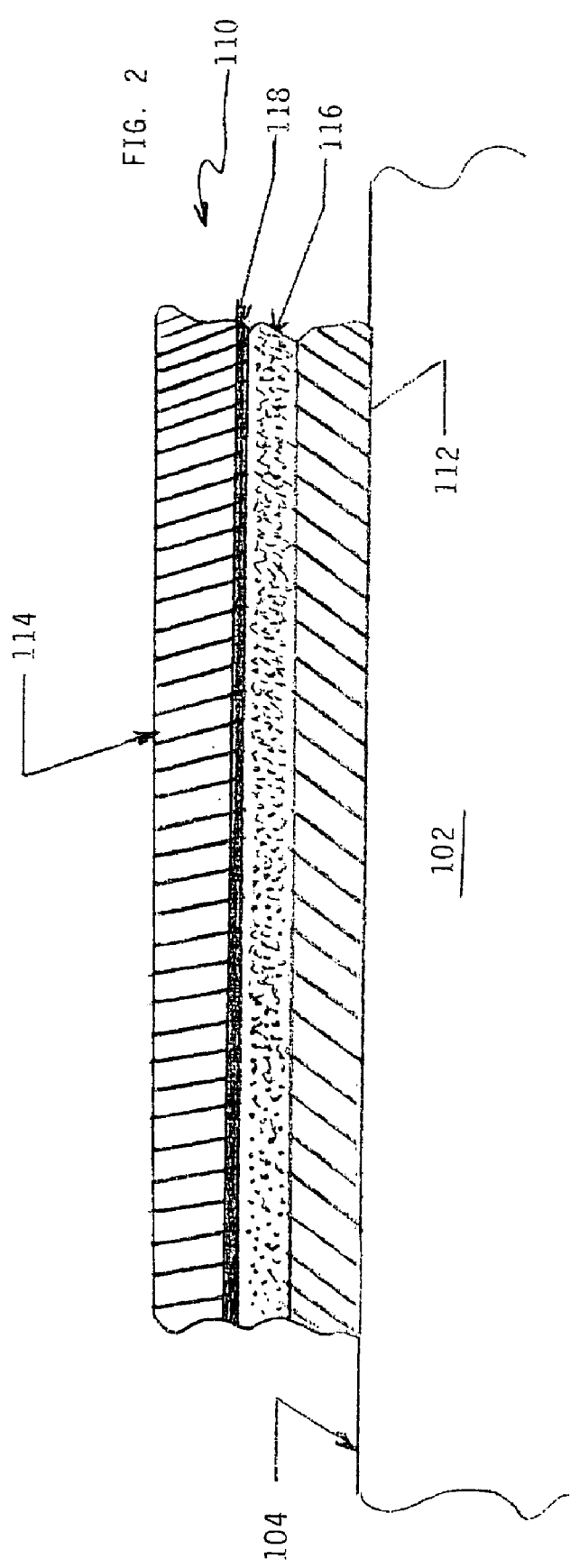
FIG. 2 is a partial side view of a two-color foil for use in providing two-sided markings.
Figure 3:
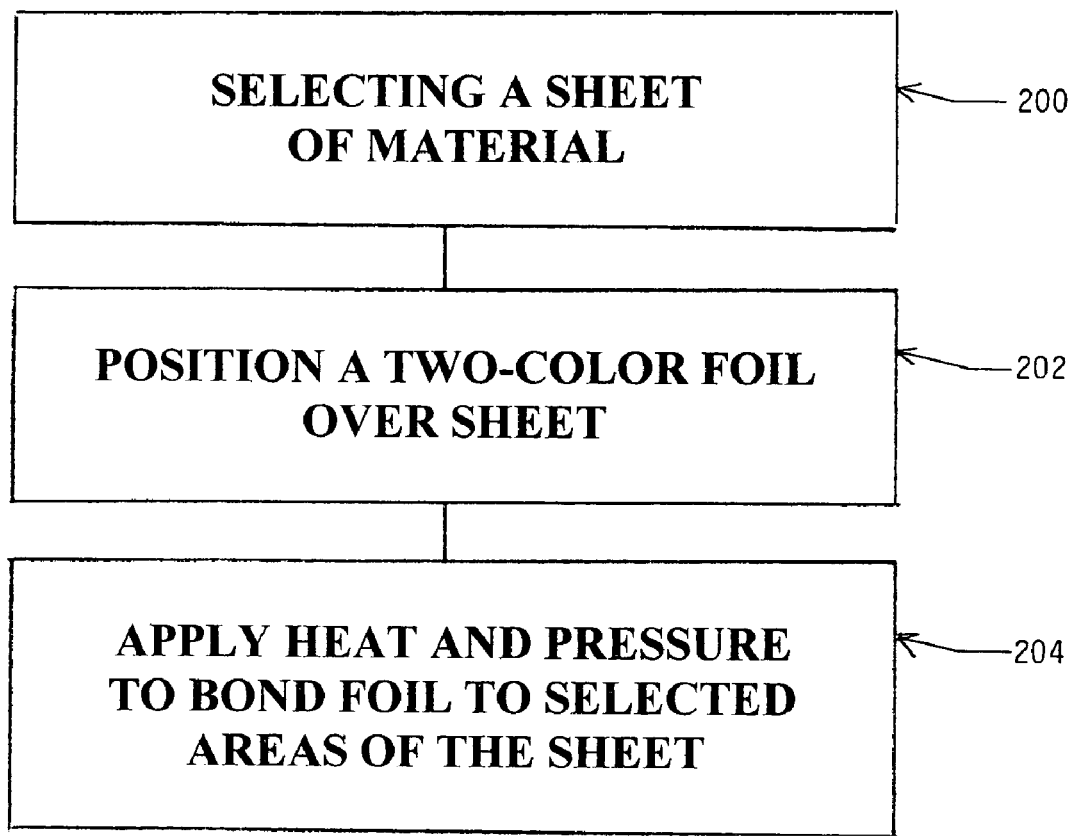
FIG. 3 is a schematic showing the process steps of forming the article of the present invention.
Figure 4:
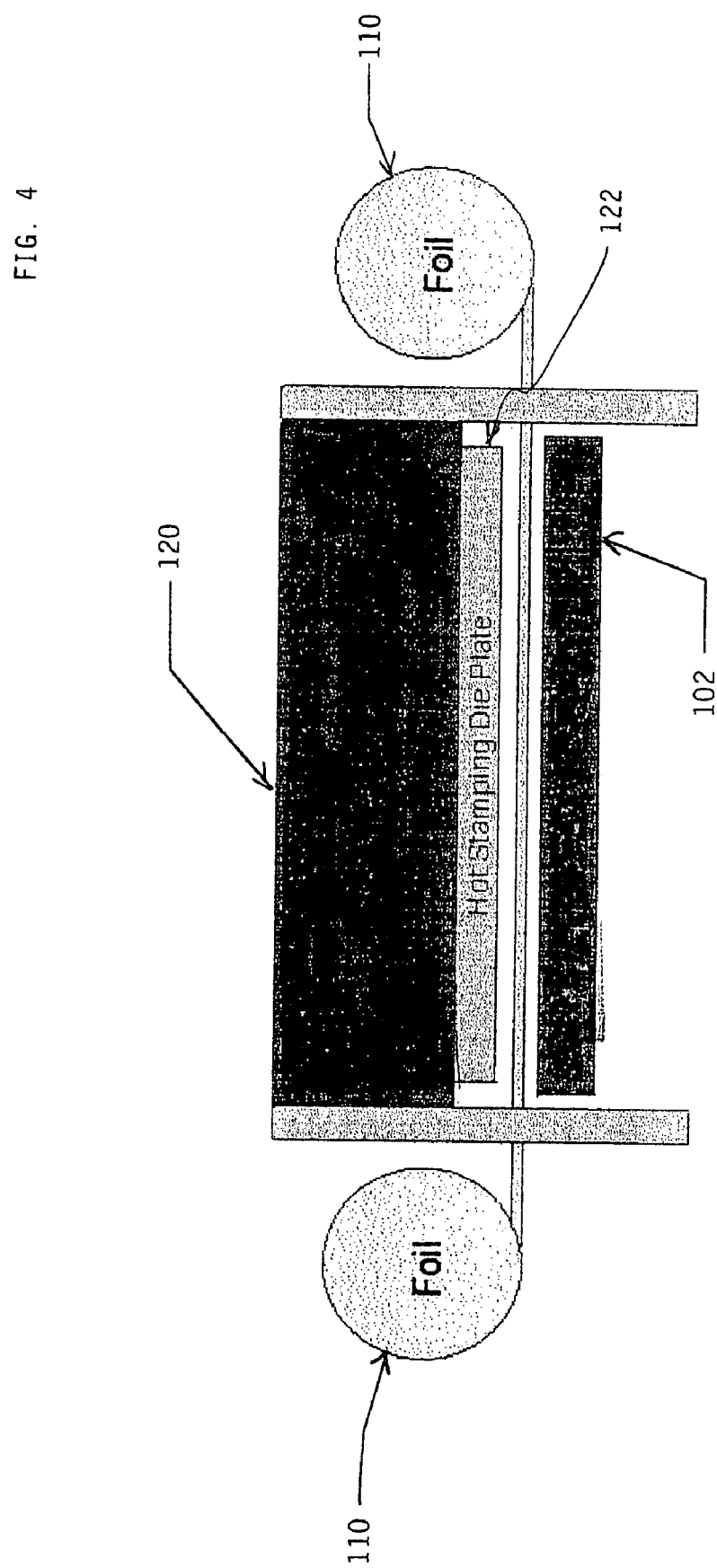
FIG. 4 is a schematic showing the process of FIG. 3 for applying the two-color foil to the see-thru sheet of material.

The markings 108 are formed using a two-color printing such as formed using a two-color metallic or pigmented foil 110 having a color on one side of the foil and a different color on the other side of the foil. Preferably, the two-color metallic or pigmented foil 110 is a hot-stamping foil such as those sold as PP-Type foils by Nakai International Corp. of Holbrook, N.Y. or under the number M364-WB2 by Imprint Technologies, Inc. of Tilbury, Ontario, Canada. Typically, as shown in FIG. 2, such foils 110 comprise a plurality of layers, usually a metallic or pigmented layer 112 (hereinafter referred collectively as the "pigmented layer"), and a carrier layer 114 that includes an adhesive 116 for adhering the pigmented layer 112 to the top face 104 of the sheet 102 to be printed. A thin film of a release agent 118 can be interposed between the carrier layer 114 and the pigmented layer 112 to facilitate separation of the pigmented layer 112 from the carrier layer 114 after adhesion of the pigmented layer 112 to the top face 104 of the sheet 102.

As illustrated in FIGS. 1 through 4, in fabricating the article 100 of the present invention, the see-thru sheet of material 102 is selected, step 200, having the desired geometry and thickness t. Depending on the particular article 100 to be formed, the sheet may be of any geometric shape, including, but not limited to, rectangular, triangular, oval, circular, and the like. The two-colored foil 110 is then positioned over the sheet 102, step 202, and is applied or bonded to the top face 104 of the sheet 102 by the application of heat and pressure to the foil 110, step 204, using a hydraulic press 120 and a conventional flat stamping punch or a conventional die 122. The punch or die 122 is patterned to correspond to the desired markings 108 to be printed onto the sheet 102. The hydraulic press 120 operates to impart the heated die 122 having a temperature of about 350–400 degrees F. (177–204 degrees C.) against the foil 110 and the top face 104 of the sheet 102. The heated die 122 activates the adhesive 116 and the release agent 118 and results in firm adhesion or bonding of the pigmented layer 112 to the top face 104 of the sheet 102. When the stamping punch or die 122 acts on the foil 110, the markings 108 are permanently transferred to the top face 104 of the sheet 102 in the raised regions of the stamping punch or die 122. After imprinting, the carrier layer 114 can be readily removed from the printed top face 104 of the sheet 102 leaving the pigmented layer 112 firmly adhered to the top face 104. It should now be apparent to those skilled in the art that by using a two-color metallic or pigmented foil requires the markings to be printed on only one side of the sheet 102 and does not require the overlapping of colors. In this way, the article does not require precise centering of overlapping lines that otherwise could interfere with precise alignment and measurement. It should also now be apparent that the process of printing the two-color metallic or pigmented foil onto the see-through sheet of material is a relatively inexpensive process.

In operation, the article 100 is placed over a work piece 10 to measured, drawn on, or otherwise worked on. Depending on which marking color is most visible against the surface of the work piece 10, the user can place the article 100 such that the top face 104 is adjacent to the surface of the work piece 10 or can place the article 100 such that the bottom face 106 is adjacent to the surface of the work piece 10.

Figure 5:
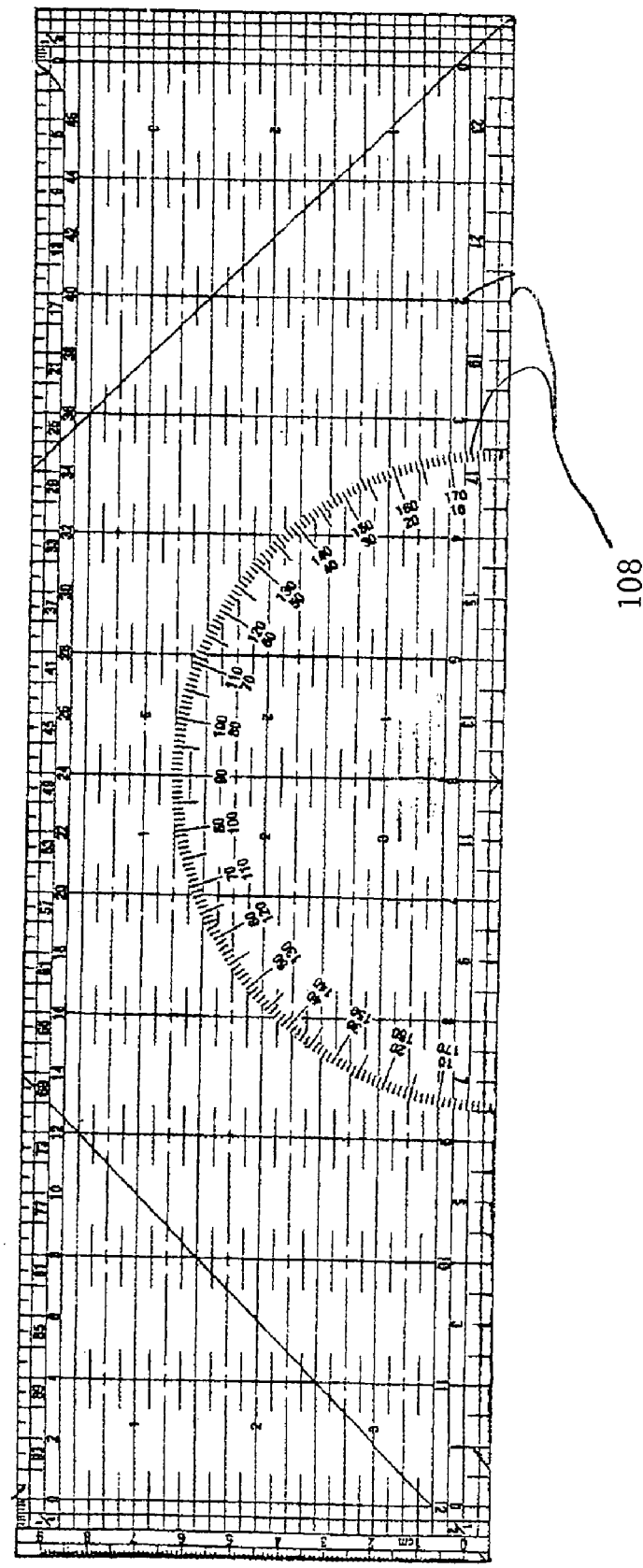
FIG. 5 is a top face view of a second representative embodiment of an article of the subject invention having two-sided markings for use as an engineering or drawing instrument.
Figure 6:
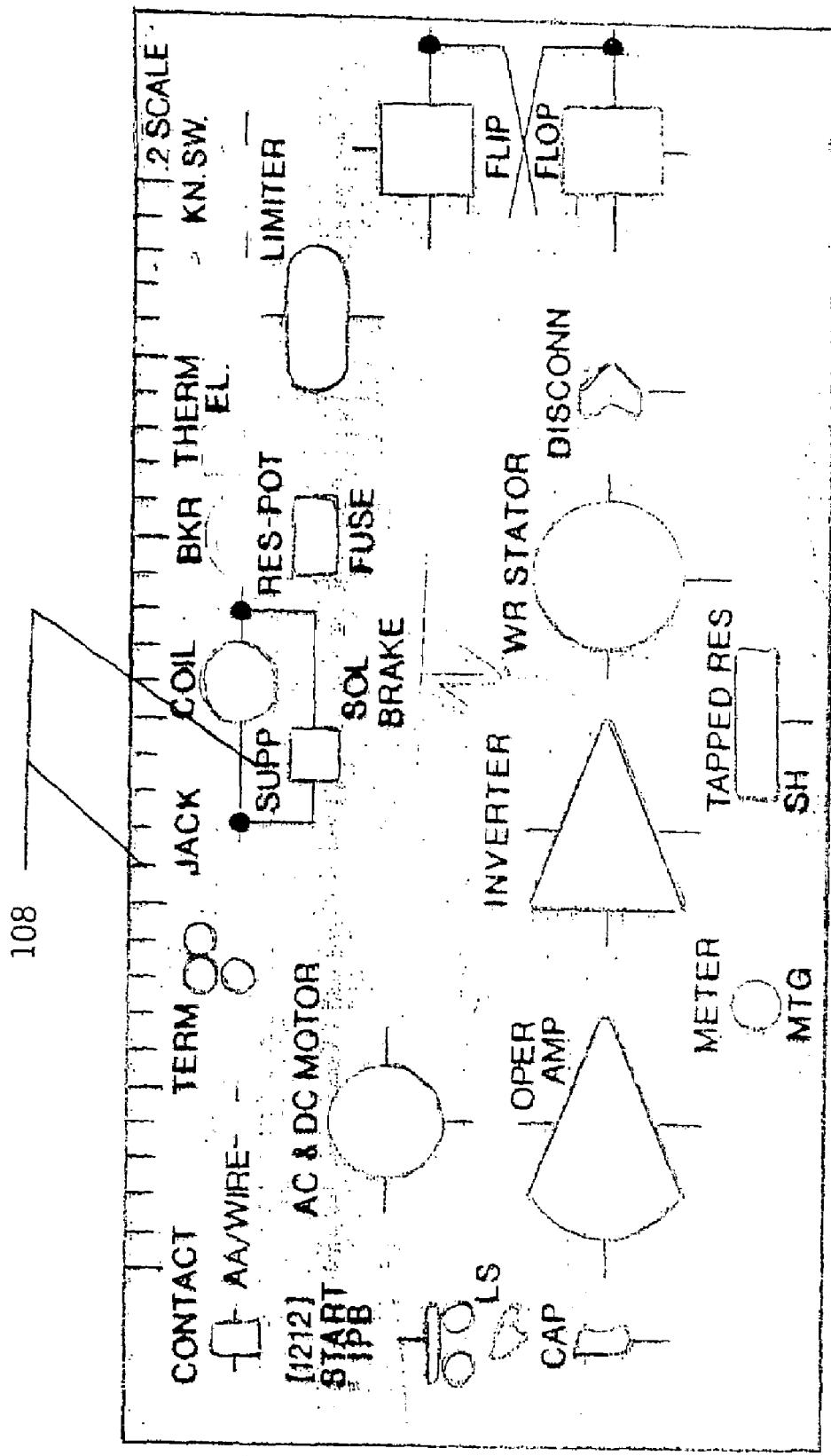
FIG. 6 is a top face view of a third representative embodiment of an article of the subject invention having two-sided markings for use as a template for the drafting and measuring of symbols.
Figure 7:
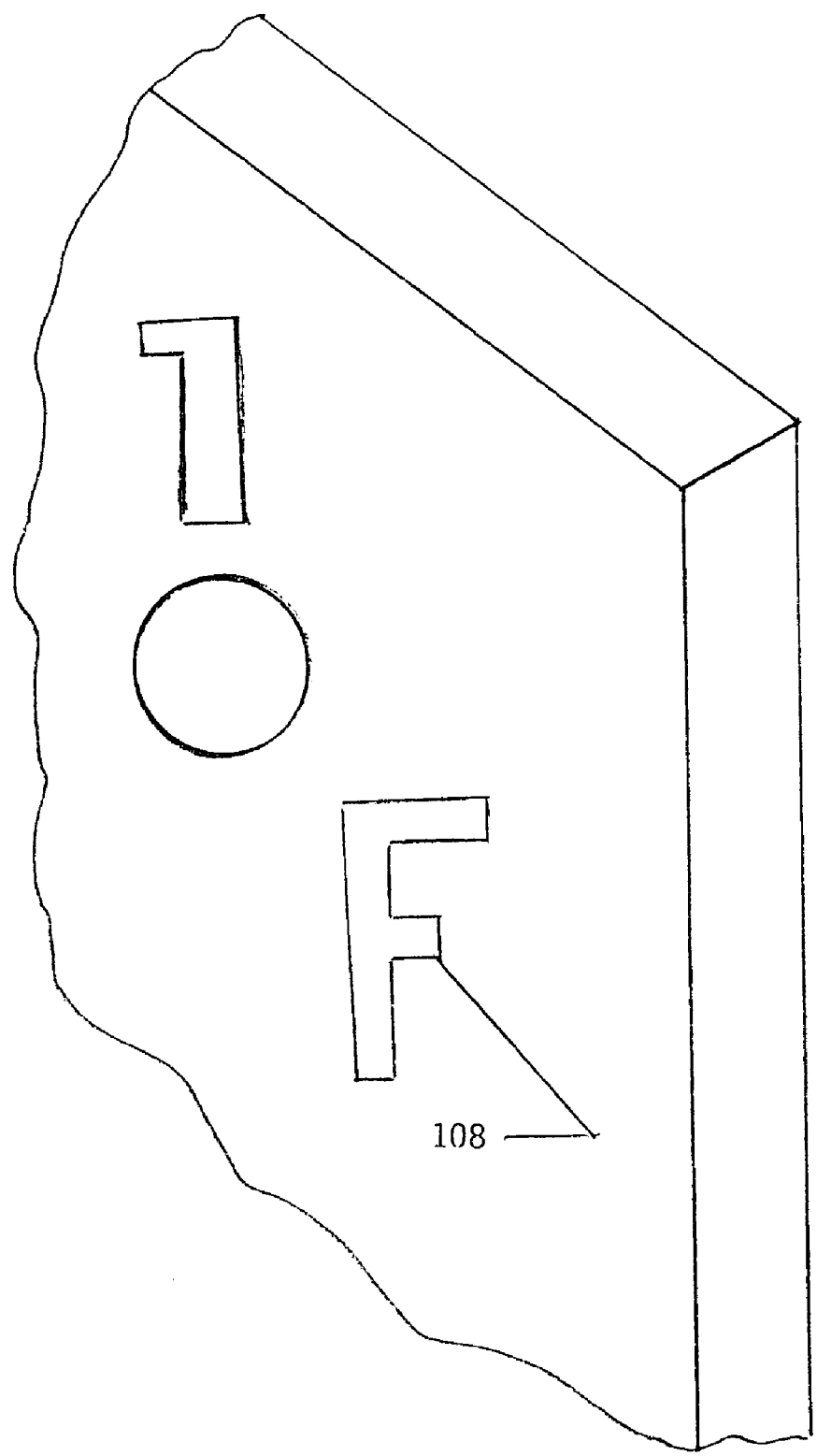
FIG. 7 is a partial perspective view of a forth representative embodiment of an article of the present invention having two-sided markings for use as a sign.

It should now be apparent to those skilled in the art that the various types of articles having use for a large variety of applications including, but not limited to measuring devices (FIG. 1) having markings 108 such as measurement markings or scales effective for taking the dimensions of the object being read; engineering and drawing instruments (FIG. 5) having markings 108 such as grids or angular indicia effective for drawing lines or taking measurements of an underlying object; templates (FIG. 6) for the drafting and measuring of symbols; and signs (FIG. 7) having markings 108 in the form of messages or designs; and the like.

Figure 8:
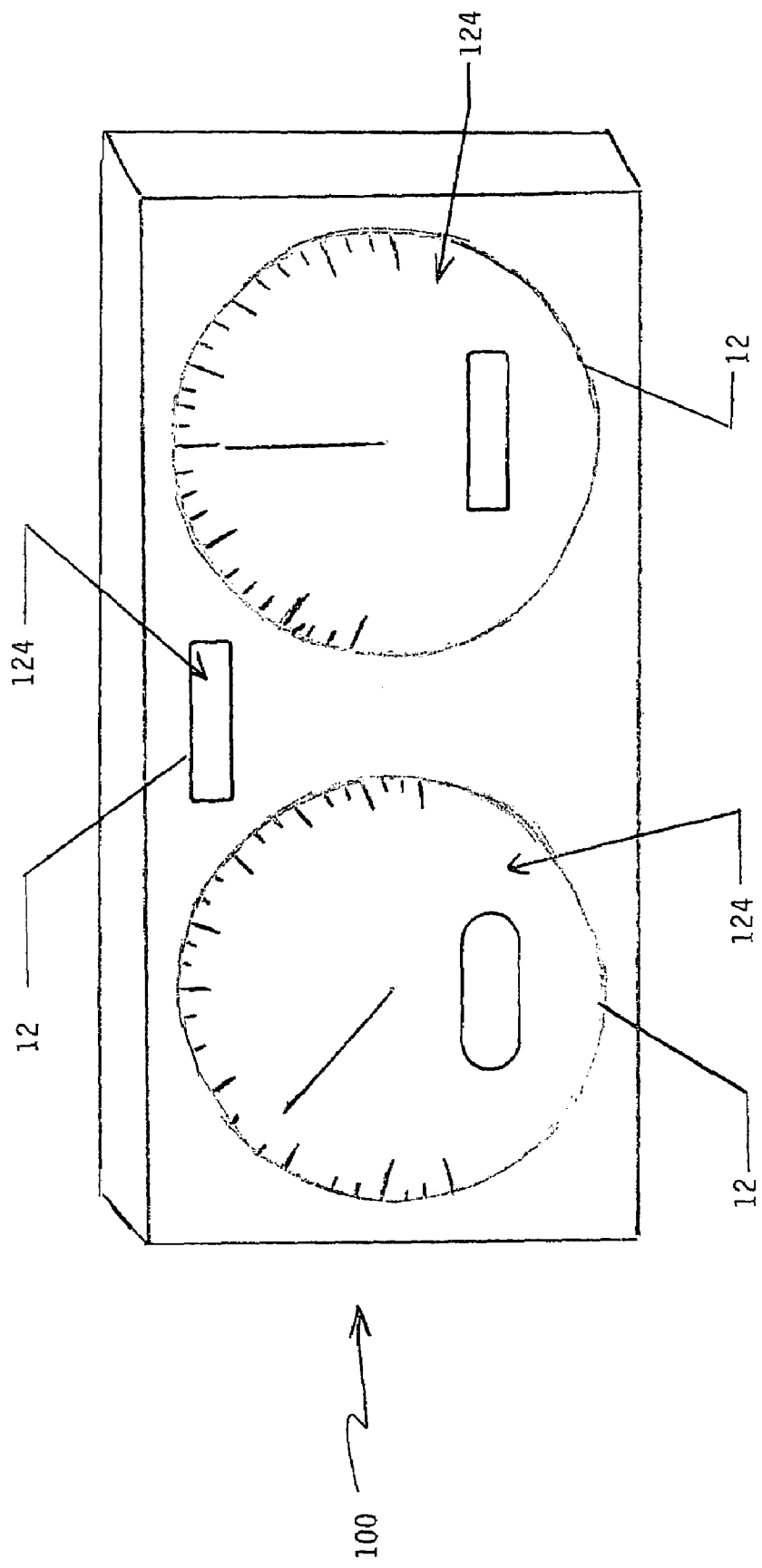
FIG. 8 is a perspective side view of a fifth representative embodiment of an article of the subject invention having two-sided markings for use as a display.

Referring to FIG. 8, it should also be understood that in a preferred embodiment of the invention, an article 100 of the present invention may be used for displays. Such articles may include a reversible instrumentation cover for automobiles manufactured using the process of the present invention. It is desirable for automobile instrumentation to appeal to the styling and aesthetic likes of the driver. As shown in FIG. 8, one embodiment of the present invention, the article 100 is an automotive instrumentation display cover. It should be understood that the markings 108 comprise color areas 124 corresponding to the particular automotive instrument 12. In use, the driver can place the article 100 in a first position over the particular instrument 12 to provide a color to the instrumentation display or can place the article 100 in a second reverse direction to provide a different color to the instrumentation display. In this way, the driver can easily change the color of the display by simply reversing the direction of the article 100.

It should now be apparent to those skilled in the art that the present invention provides articles for a large variety of applications including, but not limited to, measuring devices, engineering and drawing instruments, templates, display devices, signs, and the like, that have markings that are easily seen against multicolored backgrounds, and are relatively inexpensive to manufacture.

Accordingly, the article of the present invention is a new and novel apparatus for use against backgrounds of various colors, that has markings that are easily visible against multicolored backgrounds, that is easy to use, that can be easily and accurately manufactured, and which is relatively inexpensive to manufacture.

We claim:

1. An article comprising: a see-thru sheet having a top face and a bottom face; and a two-color foil applied on said sheet, said foil providing a plurality of single line markings for use in measuring distance; each of said markings having a first color and a second color, wherein said markings display the first color when viewed from said top face, and said markings display the second color when viewed from the bottom face.

2. The article of claim 1, wherein said first color and said second color are contrasting colors.

3. The article of claim 1 wherein said markings form a substantially smooth surface along said sheet.

4. The article of claim 1 wherein said article is selected from the group consisting of measurement devices, engineering devices, and drawing devices.

5. An article comprising: a generally planar sheet having a top face and a bottom face, and a two-color foil applied on said sheet, said foil providing a plurality of markings effective for use in measuring distance; each of said markings having a first color and a second color, wherein said markings display the first color when viewed from said top face, and said markings display the second color when viewed from the bottom face, wherein said first color overlaps said second color when viewed from the top face, and said second color overlaps said first color when viewed from the bottom face.

6. The article of claim 5 wherein said colors are contrasting colors.

7. The article of claim 5 wherein said planar sheet is a see-thru sheet of plastic.

8. The article of claim 5 wherein said planar sheet has a geometric shape selected from the group consisting of rectangular, triangular, oval, circular, and a combination thereof.

9. The article of claim 5 wherein said article is selected from the group consisting of measurement devices, engineering devices, and drawing devices.

10. The article of claim 5 wherein said marking when viewed from the top face is of more than one color.

11. The article of claim 5 wherein said marking when viewed from the bottom face is of more than one color.

\* \* \* \* \*